Feb. 3. 1925.
T. COLLINS, JR
1,525,228
LUBRICATING APPARATUS
Filed Nov. 22, 1923
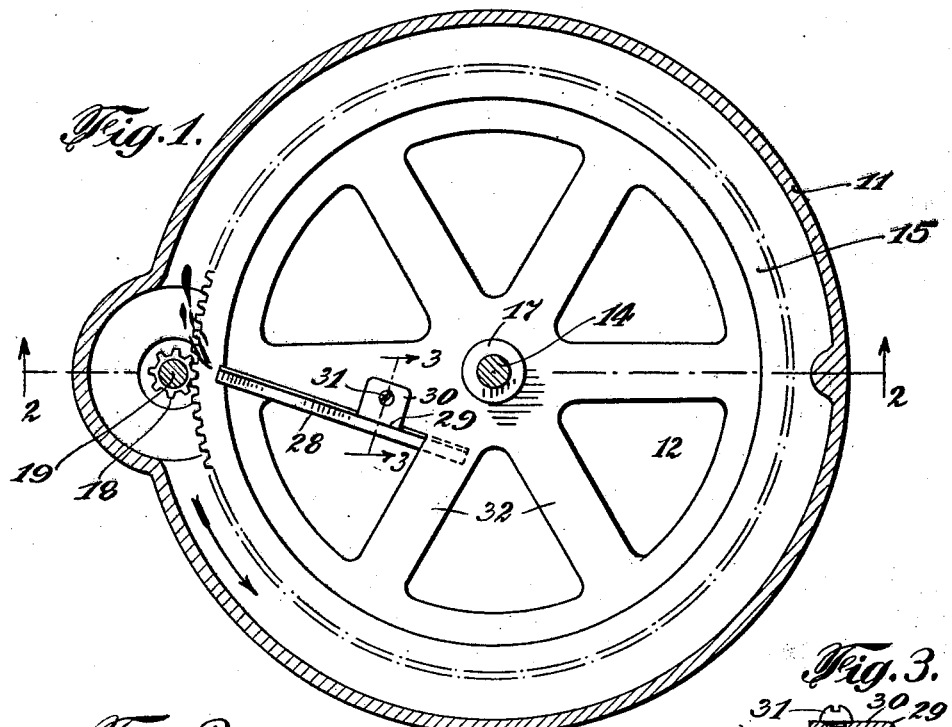
INVENTOR
Thomas Collins, Jr.
BY
his ATTORNEYS Patented Feb. 3, 1925.

1,525,228

UNITED STATES PATENT OFFICE.

THOMAS COLLINS, JR., OF BAINBRIDGE, NEW YORK, ASSIGNOR TO THE AMERICAN SEPARATOR COMPANY, OF BAINBRIDGE, NEW YORK, A CORPORATION OF NEW YORK.

LUBRICATING APPARATUS.

Application filed November 22, 1923. Serial No. 676,258.

*To all whom it may concern:*

Be it known that I, THOMAS COLLINS, Jr., a citizen of the United States, residing in Bainbridge, in the county of Chenango and State of New York, have invented an Improvement in Lubricating Apparatus, of which the following is a specification.

This invention relates to a lubricating apparatus, and while particularly designed for use in the lubrication of the bearing of the bowl spindle or shaft of a centrifugal liquid separator it will be understood that the invention is in no wise so specifically limited as it may be employed for spraying a lubricant to a vertically journaled shaft in this or any other type of apparatus in which vertical shafts are employed. Heretofore in the lubrication of the spindle shaft of separators as well as in the lubrication of similar and other parts in like and various types of machines sight feed devices have been employed. This type of feed device, however, oftentimes becomes clogged and furthermore when used in exposed places in cold or chilly weather the lubricant becomes more or less congealed and does not flow properly so that the bearing oftentimes is inadequately lubricated. I am also aware that various types of splash lubricators have been employed in centrifugal separators as well as in other apparatus, but in this type of lubricator the member by which the lubricant is conveyed from and splashed to or against the bearing to be lubricated is ordinarily a vertically placed revoluble member, such for example as a vertically placed gear. In order to obviate the necessity of using beveled gears it is oftentimes advisable to employ horizontally placed spur gears as for example in driving the bowl spindle or shaft of a centrifugal separator as shown in Letters Patent No. 863,905, granted August 20, 1907, and heretofore so far as I am aware no adequate provision has been made for the splash feed for a bearing driven by this type of horizontally placed spur gears. The object of my invention is, therefore, the provision of a lubricating device employed in conjunction with a horizontally placed gear or other revoluble member for supplying the necessary lubricant to a bearing of a bowl spindle or other bearings of a centrifugal liquid separator, or to bearings of a similar apparatus, as will be hereinafter more particularly described.

In the drawing:

Fig. 1 is a section on line 1—1, Fig. 2.

Fig. 2 is a longitudinal section taken on line 2—2, Fig. 1, illustrating a lubricating apparatus made in accordance with my present invention, and Fig. 3 is a section illustrating one form in which the lubricant conduit may be constructed.

Referring to the drawing in which I have illustrated my invention as applied to the bowl spindle bearing of a centrifugal liquid separator, 10 represents a base or a portion of the base of the apparatus upon which or made integral with which there is a gear case 11 so constructed as to include an oil or lubricant reservoir 12. At the upper end of the base the same is fitted with a bearing 13 in which the lower end of a drive shaft 14 is journaled. On the drive shaft 14 there is a gear 15. The drive shaft 14 is mounted in a vertical position and the gear 15 in a horizontal position. The gear is secured to the drive shaft by a pin 16 passing through the hub 17 of the gear and also through the shaft 14 or otherwise. This gear 15 carries a lubricant conveyor or conduit as hereinafter described. Meshing with the gear 15 is a pinion 18. This pinion 18 is carried by and secured to a bowl spindle or other shaft 19. The lower end of the shaft 19 is journaled in a bearing 20 suitably mounted in the frame of the apparatus at one side of the pinion 18. At the opposite side of the pinion 18 the shaft 19 is journaled in a bearing 21. At the end of the bearing 21 adjacent the pinion 18 the same is provided with a reduced section 22 and a lip or peripheral flange 23 immediately above which latter there is a series of openings 24 in the reduced portion of the bearing for the purpose of admitting a suitable lubricant. That portion of the shaft 19 which passes through the bearing 21 is provided with a spirally disposed groove 25 to automatically raise the lubricant or cause the same to work through the bearing to adequately lubricate the same and to be discharged into a well 26 provided for this purpose at the upper or outer end of the bearing in which there are also passages 27 through which the lubricant may flow from the well 26 and return to the lubricant reservoir.

My present invention more particularly relates to the conduit device for raising the lubricant from the reservoir and supplying the same to the bearing 21. For this purpose, as illustrated, I employ a conduit 28. This conduit as shown comprises an angular channel member, although, as will be understood, it may be of a tubular, or a wing, or any similar construction for adequately raising and conveying the lubricant, or causing the lubricant to be raised and conveyed from the reservoir in which the same is contained to the bearing or bearings to be lubricated. In any event the conduit 28 may be provided with a lug 29 and a flange 30 or other similar devices by which and a screw 31 or other attaching device the conduit is connected to one of the ribs or spokes 32 of the horizontally placed gear. The conduit is so constructed relatively to the lug and flange associated therewith that it is inclined when in position, that is when secured to the gear so that the lower end of the conduit extends into the lubricant in the reservoir and the upper end extends sufficiently far to come adjacent to the bearing to be lubricated with each revolution of the gear. It will be apparent that the conduit for the lubricant as illustrated is not only inclined to the horizontal but is also placed at an angle to the radius of the rib or spoke of the gear to which it is connected, and as will clearly appear in Fig. 1 of the drawing the lower end of the conduit is preferably placed at a greater distance from the radius of the spoke than the upper end thereof. Obviously also the conduit may be adjusted to position with the lower end thereof at greater or lesser distances from the radius of the spoke and consequently from the center of revolution so that the speed per linear unit of travel at which the lower end of the conduit turns may be correspondingly increased or decreased to govern the quantity of the lubricant which is raised thereby through rotary action and consequently supplied to the bearing to be lubricated. It will furthermore be apparent that the conduit may be an integral part of the gear or revoluble member by which it is rotated.

Also as illustrated and as is clearly shown in Fig. 2 the frame of the apparatus may be provided with a plug 33 normally closing an inlet for lubricant to be supplied to the reservoir 12. The apparatus may also include a similar plug 34 placed in the upper portion of the frame and the lower portion of the lubricant chamber for making it possible to remove the lubricant and readily cleanse the lubricant chamber. The lubricant chamber may also be fitted with an overflow pipe 35 through which any surplus lubricant will pass to a cup or receptacle 36 provided therefor and suitably connected to the frame of the apparatus by a screw or bolt 37 or otherwise.

I claim as my invention:

1. In a lubricating apparatus, a horizontally mounted revoluble member, a lubricant reservoir, and a conveyor carried by the said revoluble member, the said conveyor being placed at an angle to the radius of the revoluble member and having its inner end spaced further from the radius than the outer end thereof and extending into the said lubricant reservoir so that due to the rotary motion of the revoluble member lubricant is delivered from the outer end of the conveyor for lubricating purposes.

2. In a lubricating apparatus, a horizontally disposed revoluble member, a lubricant reservoir, and a lubricant conveyor carried by the revoluble member, the said lubricant conveyor being inclined to the axis of the revoluble member and also placed at an angle to the radius thereof, with the inner end of the lubricant conveyor extending into the lubricant reservoir and terminating in a position further from the radius of the revoluble member than the outer end thereof so that due to the rotary motion of the revoluble member lubricant is delivered from the outer end of the conveyor for lubricating purposes.

3. In a lubricating apparatus, a horizontally mounted revoluble member, a lubricant reservoir, and a conduit connected to and carried by the said revoluble member, the said conduit being placed at an angle to the radius of the said revoluble member with the inner end of the conduit spaced further from the radius than the outer end thereof and adapted to extend into a lubricant in the said reservoir.

4. In a lubricating apparatus, a horizontally disposed revoluble member, a lubricant reservoir, and a conduit connected to and carried by the revoluble member, the said conduit being inclined to the axis of rotation of the revoluble member and also at an angle to the radius thereof so that the inner end of the conduit extends into the reservoir and is further from the radius of the revoluble member than the outer end thereof, which latter end in the revolution of the conduit is adapted to come adjacent a device to be lubricated.

5. In a lubricating apparatus, a horizontal gear having a plurality of spokes, a lubricant reservoir above which the gear is mounted, and a conduit connected to a spoke of the said gear, the said conduit having its inner end extending into the lubricant reservoir and its outer end coming adjacent a device to be lubricated in the revolution of the said gear.

6. In a lubricating apparatus, a horizontally mounted gear having a plurality of spokes, a lubricant reservoir above which the gear is mounted, and a channel conduit connected to a spoke on the said gear at an angle to the radius of the gear and also at an inclination to the axis of rotation of the gear so that the inner end of the channel extends into the oil reservoir and the outer end of the channel is adapted to come adjacent a device to be lubricated in the revolution of the gear.

7. In a lubricating apparatus, a horizontally mounted gear having a plurality of spokes, a lubricant reservoir above which the said gear is mounted, and a channel conduit connected to a spoke on the said gear so as to assume an angle to the radius of the said gear, the said channel conduit at one end extending into the reservoir so as to enter a lubricant contained therein and at its outer end coming adjacent a device to be lubricated in the revolution of the gear.

Signed by me this 6 day of Oct., 1923.

THOMAS COLLINS, Jr.